United States Patent
Verger et al.

(10) Patent No.: US 12,345,368 B2
(45) Date of Patent: Jul. 1, 2025

(54) METAL TUBULAR COMPONENT, TUBULAR THREADED JOINT COMPRISING SUCH A COMPONENT AND METHOD OF OBTAINING SUCH A COMPONENT

(71) Applicant: VALLOUREC OIL AND GAS FRANCE, Aulnoye-Aymeries (FR)

(72) Inventors: Eric Verger, Meudon (FR); Gabriel Roussie, Meudon (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 18/704,583

(22) PCT Filed: Oct. 10, 2022

(86) PCT No.: PCT/EP2022/078062
§ 371 (c)(1),
(2) Date: Apr. 25, 2024

(87) PCT Pub. No.: WO2023/072563
PCT Pub. Date: May 4, 2023

(65) Prior Publication Data
US 2024/0410514 A1    Dec. 12, 2024

(30) Foreign Application Priority Data
Oct. 26, 2021   (FR) ...................... 2111360

(51) Int. Cl.
*F16L 59/147*    (2006.01)
*F16L 15/00*    (2006.01)
(Continued)

(52) U.S. Cl.
CPC .......... *F16L 59/147* (2013.01); *F16L 15/001* (2013.01); *F16L 59/10* (2013.01); *F16L 59/15* (2013.01)

(58) Field of Classification Search
CPC .......... F16L 59/147; F16L 59/15; F16L 59/00; F16L 59/02; F16L 59/028; F16L 59/029;
(Continued)

(56) References Cited

U.S. PATENT DOCUMENTS 3,425,455 A    2/1969  Kilpert et al.
3,482,007 A *  12/1969  Routh .................... F16L 58/10
                                                              264/269
(Continued)

FOREIGN PATENT DOCUMENTS

CN    212774167 U    3/2021

OTHER PUBLICATIONS

International Search Report and Written Opinion dated Jan. 23, 2023 in PCT/EP2022/078062 filed on Oct. 10, 2022, 8 pages (with English Translation).

*Primary Examiner* — Aaron M Dunwoody
(74) *Attorney, Agent, or Firm* — Oblon, McClelland, Maier & Neustadt, L.L.P.

(57) ABSTRACT

A metal tubular component adapted to be associated with at least one other metal tubular component to form a joint, said metal tubular component having a longitudinal axis, a body and at least one first axial end adjacent to the body, said first axial end being provided with a connector including a thread and an internal abutment surface, the metal tubular component further including a wall with an internal surface, said internal surface being coated with a layer of a thermally-insulating material, said layer of thermally-insulating material being covered by a liner, said liner having an axial portion extending along the longitudinal axis and a radial portion, said radial portion extending along the internal abutment surface.

13 Claims, 2 Drawing Sheets

(51) Int. Cl.
  *F16L 59/10*    (2006.01)
  *F16L 59/15*    (2006.01)
(58) Field of Classification Search
  CPC ......... F16L 15/00; F16L 15/001; F16L 58/00;
          F16L 58/02; F16L 58/04; F16L 58/06;
        F16L 58/08; F16L 58/18; F16L 58/182;
                      F16L 58/185
  See application file for complete search history.

(56) References Cited

U.S. PATENT DOCUMENTS

| | | | |
|---|---|---|---|
| 4,507,842 A * | 4/1985 | Werner | E21B 17/042 |
| | | | 285/55 |
| 5,906,399 A | 5/1999 | Noel | |
| 6,073,332 A | 6/2000 | Turner | |
| 6,312,024 B1 * | 11/2001 | Dutilleul | E21B 17/042 |
| | | | 285/55 |

* cited by examiner

METAL TUBULAR COMPONENT, TUBULAR THREADED JOINT COMPRISING SUCH A COMPONENT AND METHOD OF OBTAINING SUCH A COMPONENT

TECHNICAL FIELD

The invention relates to the field of threaded metal tubular components and joints resulting from the assembly of two threaded tubular components, primarily in the geothermal field. However, the present invention can equally well concern the fields of petroleum and gas, energy or storage, and in particular use such as exploitation of hydrocarbon wells, transport of hydrocarbons or carbon capture. The invention also relates to a method of obtaining such threaded tubular components.

TECHNOLOGICAL BACKGROUND

Here by "component" is meant any tube or accessory used to drill or to exploit a well, in particular in the geothermal field, and comprising at least one connection or connector or threaded tubular element and intended to be assembled by a thread to another component to constitute with said other component a threaded tubular joint. The component may be for example a tube of relatively great length, for example approximately 13 meters long. Such metal tubular components have an elastic limit that is preferably greater than or equal to 500 MPa.

Metal tubes are widely used in various fields of the energy industry, such as the geothermal field, in the production of electricity, petroleum and gas, and in mechanical construction as well as in carbon capture and storage. In the geothermal field the metal tubes are configured to circulate various products, in particular fluids at high temperature. In a geothermal application the heat conveyed by these fluids is used for different purposes such as the creation of electricity or heating/air-conditioning systems. Consequently, conservation of heat is an important parameter in a geothermal application, in particular in a geothermal well in which fluids conveying this heat circulate. The tubular components used to produce these wells must therefore have optimum thermal-insulation properties in order to minimize losses of heat when fluids circulate inside them.

For thermally-insulating tubular components intended for geothermal applications the prior art describes primarily the technique commonly known as the vacuum insulated tube or VIT technology. The VIT technology consists in placing a first steel tube inside a second steel tube, the second tube having a diameter greater than the first tube so as to leave a space between the external surface of the first tube and the internal surface of the second tube. A vacuum is then created in the space between the two tubes to prevent exchanges of heat between the two tubes. However, a tube with such a VIT structure is costly and has the disadvantage of being very heavy, in particular because it includes two steel tubes instead of a single one as in conventional tubes. A tube having this structure is therefore not suitable for the construction of deep wells, such as geothermal wells having for example a depth of 4000 meters or more. Such a column could not resist the vertical stretching and tensile forces that would then be applied to the tubes that constitute it.

SUMMARY

One idea behind the invention for alleviating the above disadvantages is significantly to reduce exchanges of heat between the interior and the exterior of a geothermal well at the same time as reducing the costs of manufacturing the tubes constituting such a well. In particular, one basic idea behind the invention is to limit heat losses to the outside of the well occurring at the level of the connections between the tubes. Another idea behind the invention is to produce tubes enabling the construction of geothermal wells at great depths.

Thus the invention provides a metal tubular component adapted to be associated with at least one other metal tubular component to form a joint, said metal tubular component having a longitudinal axis x, a body and at least one first axial end adjacent to the body, said first axial end being provided with a connector including a thread and an internal abutment surface, the metal tubular component further including a wall with an internal surface, said internal surface being coated with a layer of a thermally-insulating material, said layer of thermally-insulating material being covered by a liner, said liner having an axial portion extending along the longitudinal axis x and a radial portion, said radial portion extending along the internal abutment surface.

Here by "thread" is meant a portion threaded over a particular axial length. By "axial length" is meant a length that extends along the longitudinal axis x.

Also, here by "adjacent" is meant that the first axial end is in contact with the body of the metal tubular component.

With such a configuration the liner holds the layer of thermally-insulating material pressed against the internal surface of the tubular component. The internal surface of the tubular component can therefore be thermally-insulated over the entire axial length of the tubular component, including at the level of the connector and independently of whether the connector is male or female. Furthermore, the liner protects the thermally-insulating material from various products that may circulate in a geothermal well. In particular, in a geothermal well fluids circulate at high pressures that would tend to degrade the thermally-insulating material. Furthermore, the liner also has a sealed barrier function between the thermally-insulating material and the circulating fluids. Thus, the liner enables the thermally-insulating material to maintain its insulating function by protecting it against degradation by the circulating fluids.

Another advantage of this configuration, in particular compared to a "VIT" structure routinely used in geothermal applications, is that the insulation necessitates only one steel tube and therefore has a much lower weight than a VIT structure. Consequently, columns consisting of tubular components in accordance with the invention can be longer, which makes it possible to produce wells at greater depth. Also, compared to a VIT structure that includes a vacuum between the two steel tubes that constitute it, the wall of a tubular component in accordance with the invention does not include a vacuum and is therefore more resistant to collapse linked to high pressures that may be exerted on its wall, in particular at great depths.

The metal tubular component in accordance with embodiments of the invention may have one or more of the following features.

In accordance with an embodiment the internal surface of the wall of the metal tubular component is entirely covered by the layer of thermally-insulating material. Thanks to this feature the thermal insulation is improved because the entirety of the internal surface is coated by the layer of thermally-insulating material.

In accordance with an embodiment the layer of thermally-insulating material has a first insulating surface and a second insulating surface.

In accordance with an embodiment the second insulating surface forms a shoulder having a radial end surface. In the present patent application the terms "radial surface" and "radial portion" mean that said surface and said portion extend radially.

In accordance with an embodiment the end radial surface extends radially in line with the internal abutment surface.

In accordance with an embodiment the radial portion of the liner extends along the end radial surface of the shoulder formed by the second insulating surface.

In accordance with an embodiment the layer of thermally-insulating material is entirely covered by the liner. Here it must be understood that at least the second insulating surface, which includes the end radial surface, is entirely covered by the liner. Thanks to this feature the layer of thermally-insulating material is entirely protected by the liner, in particular from the circulating fluids.

In accordance with an embodiment the metal tubular component may have a second axial end identical to or different from the first axial end. For example, the second axial end may be provided with a male or female connector having a structure and a geometry identical to or different from the connector of the first axial end.

In accordance with an embodiment the liner is welded to the connector.

Welding enables better association between the material of which the liner is made and the material of which the tubular component is made. This results in solid and durable fixing of the liner, in particular when the latter is pinched between two surfaces of internal abutments in a joint. This therefore enables a good seal and good protection of the layer of thermally-insulating material by the liner.

In accordance with an embodiment the radial portion of the liner is welded to the connector:
- either at a male distal end when the connector is a male connector,
- or at the base of a female internal abutment when the connector is a female connector.

Thanks to these features the layer of thermally-insulating material is covered by the liner, including at the level of its end radial surface. Furthermore, when the connector is a male connector, the liner extends radially from the male distal end over the entire length of a male internal abutment surface. When the connector is a female connector, the liner extends radially from the base of the female internal abutment over the entire length of a female internal abutment surface. Accordingly, whether the connector is male or female, the internal abutment surface is entirely covered by the liner. Consequently, the tubular component has a better seal over its entire axial length and better protection from products circulating in the metal tubular component. Furthermore, when a tubular component in accordance with the invention is coupled to another tubular component in accordance with the invention the joint formed in this way has an improved seal because of the compression of the radial portions of the liners of each of the two tubular components between their respective abutment surfaces and between the end radial surfaces of their respective layers of thermally-insulating material.

In accordance with an embodiment, when the connector is a male connector said male connector may further comprise a lip, said lip extending axially between the male distal end and the male thread. In the present patent application the expression "extends axially" means that the element concerned extends along the longitudinal axis x. Thus the lip extends along the longitudinal axis x. It is therefore clear that when the male connector includes a lip the male distal end corresponds to the end of the lip and that in the absence of any such lip the male distal end corresponds to the end of the male thread. In other words, depending on whether the male connector includes a lip or not, the expression "male distal end" may designate either the junction between the male internal abutment surface and the lip or the junction between the male internal abutment surface and the male thread. In accordance with an embodiment the lip may include a sealing bearing surface.

In accordance with an embodiment, when the connector is a female connector said female connector may further have a female housing inside diameter, said female housing inside diameter extending axially between the base of the female internal abutment and the female thread. It is therefore clear that, depending on whether the female connector has a female housing inside the diameter or not, the expression "base of the female internal abutment" may designate either the junction between the female internal abutment surface and the female housing internal diameter or the junction between the female internal abutment surface and the female thread.

In accordance with an embodiment the liner is a metal liner produced using a corrosion-resistant alloy. In the present invention, the term "liner" may refer to an element commonly known as such by the person skilled in the art, such as a metal liner. The liner is therefore preferably a liner produced using a corrosion-resistant alloy. Generally speaking, the liner may be made using various corrosion-resistant steels such as steels containing chromium and/or nickel. This type of steel is described in particular in the proprietor's application EP3314032. In the light of the present description, the person skilled in the art will therefore understand unambiguously that even when the liner is curved so as to form a tubular structure it cannot be compared with a metal tube as defined in the steel tubes industry for the fields of application of the present invention. In fact, a tube the structure of which would essentially consist of a liner would obviously not be suitable for use in the field of the invention. It is therefore not a question of a first metal tube inside a second metal tube as in a VIT structure.

In accordance with an embodiment the liner has a thickness between 1 mm and 10 mm inclusive, preferably a thickness between 1 mm and 5 mm inclusive.

In accordance with an embodiment the thermally-insulating material has a mass per unit volume less than or equal to 50% of the mass per unit volume of the steel, preferably less than or equal to 40% of the mass per unit volume of the steel, even more preferably less than or equal to 35% of the mass per unit volume of the steel, the mass per unit volume of said steel being between 6800 kg/m$^3$ and 9000 kg/m$^3$ inclusive. The mass per unit volume of such a steel is on average 7850 kg/m$^3$.

In accordance with an embodiment the thermally-insulating material may be concrete or a ceramic. The layer of thermally-insulating material may preferably be produced using ceramic or concrete bricks, and even more preferably using ceramic or concrete bricks enriched with insulating particles. Here by "insulating particles" is meant elements adapted to limit exchanges of heat inside the thermally-insulating material, such as particles of vermiculite or glass balls. The thermally-insulating material may be a material adapted to resist temperatures above 100° C. The thermally-insulating material could equally well be a material able to resist compression forces greater than equal to 100 bar, preferably greater than or equal to 250 bar, even more preferably greater than or equal to 300 bar.

In accordance with an embodiment the ratio between the thickness of the liner and the insulation thickness of the layer of thermally-insulating material is at least ¼, preferably at least ⅕ and ideally at least ⅙.

In accordance with an embodiment the layer of thermally-insulating material has an insulation thickness between 5 mm and 60 mm inclusive, preferably an insulation thickness between 6 mm and 30 mm inclusive.

These features contribute to the fact that a tubular component in accordance with the invention has a much lower weight than the VIT structures used in geothermal applications. Consequently, the columns may be longer, which enables production of wells at greater depths.

In accordance with an embodiment a junction between the axial portion and the radial portion of the liner is at an angle β between 85° and 90° inclusive, preferably between 89° and 90° inclusive.

An angle β less than 85° risks producing a void between the liner and the layer of thermally-insulating material, in particular when two tubes in accordance with the invention are coupled. This could cause deformation of the liner with the risk of it breaking up, in particular at the level of the junction between its axial portion and its radial portion.

The present invention also relates to a tubular threaded joint comprising:
 a first tubular component in accordance with the invention, said first tubular component including a male connector,
 a second tubular component in accordance with the invention, said second tubular component including a female connector,
the first tubular component and the second tubular component being assembled together by screwing the male connector of the first tubular component into the female connector of the second tubular component. In accordance with an embodiment the female housing inside diameter is greater than the diameter of the male lip. Such a feature makes it possible to prevent radial interference. Accordingly, wear of the tubular components, which is caused in particular by their multiple assemblies by screwing them together, is limited.

In accordance with an embodiment the tubular threaded joint may comprise:
 a first tubular component in accordance with the invention, said first tubular component including a first male connector,
 a second tubular component in accordance with the invention, said second tubular component including a second male connector, and
 a coupling element assembled with the first male connector and with the second male connector by screwing it thereto.

In the context of the present invention by "coupling element" is meant a connecting accessory or connector intended to connect two threaded tubular elements and frequently referred to in the literature by the term "coupling". Such a coupling element therefore corresponds to a metal tubular connecting part that extends along a longitudinal axis and has two threaded ends that may be identical or different.

With such a configuration the joint formed is entirely thermally insulated. Consequently, when such a joint is used in a geothermal well and a fluid passes through the interior of the tubes the energy losses by emission of heat are greatly reduced, including at the level of the joints that connect these tubes. The production of energy by such a geothermal well is therefore significantly optimized.

Moreover, in such a joint the contact between the surfaces of the abutments of the connectors leads to pinching of the liners both over the entire length of the internal abutment surfaces and equally over the entire length of the end radial surface of the shoulder formed by the second insulating surface. Such a configuration therefore produces a seal by compression of the liners against one another, which improves the seal of the joint.

Finally, another object of the present invention concerns a method for obtaining a metal tubular component in accordance with the invention, said method including at least the following steps:
 a step of pressing the liner against the layer of thermally-insulating material by hydraulic expansion, and
 a step of welding the liner to the male connector.

BRIEF DESCRIPTION OF THE FIGURES

The invention will be better understood and other aims, details, features and advantages thereof will become more clearly apparent in the course of the following description of particular embodiments of the invention given by way of non-limiting illustration only and with reference to the appended drawings.

However, it must be understood that the present application is not limited to the specific arrangements, structures, features, embodiments and arrangements indicated. The drawings are not to scale and are not intended to limit the scope of the claims to the embodiment or embodiments represented in the drawings.

Consequently it must be understood that when features mentioned in the claims are followed by reference numbers said reference numbers are included only to improve the understanding of the claims and in no case to limit the scope thereof.

Figure 1:
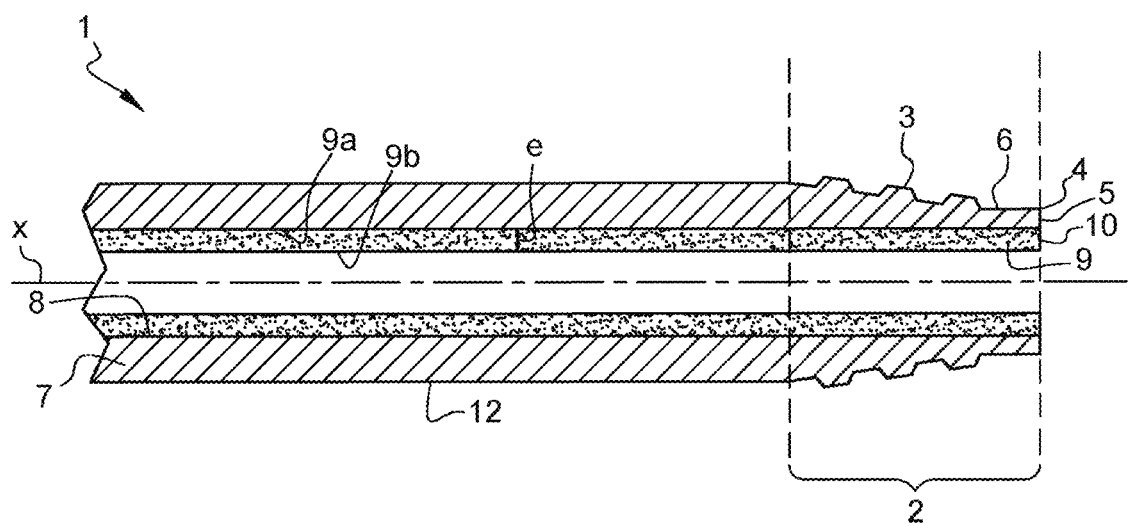

FIG. 1 is a schematic view in longitudinal section of a portion of a metal tubular component provided with a male connector in accordance with an embodiment of the invention (liner not represented).

Figure 2:
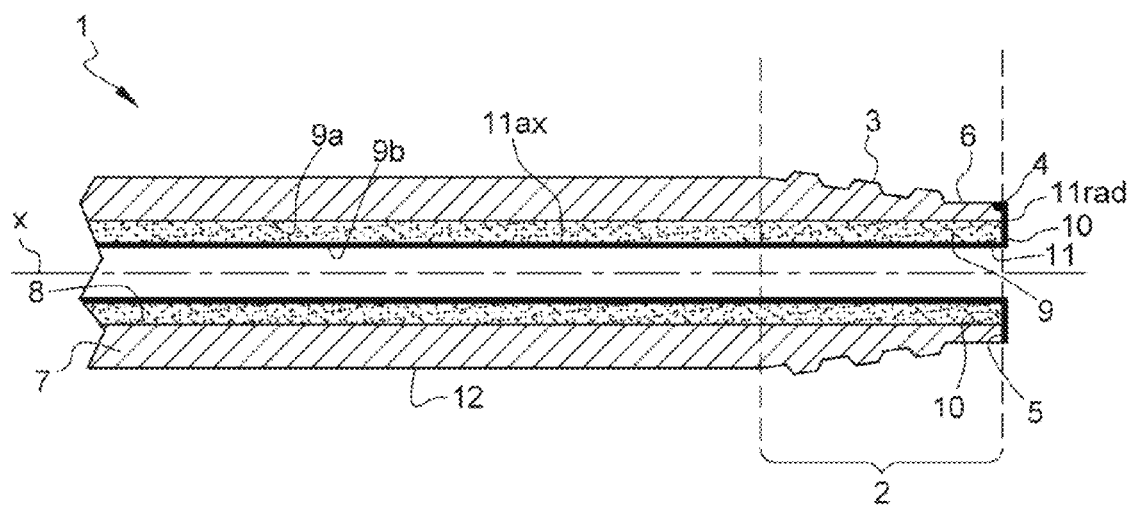

FIG. 2 is a schematic view in longitudinal section of a portion of a metal tubular component as schematically represented in FIG. 1 in which the liner is represented.

Figure 3:
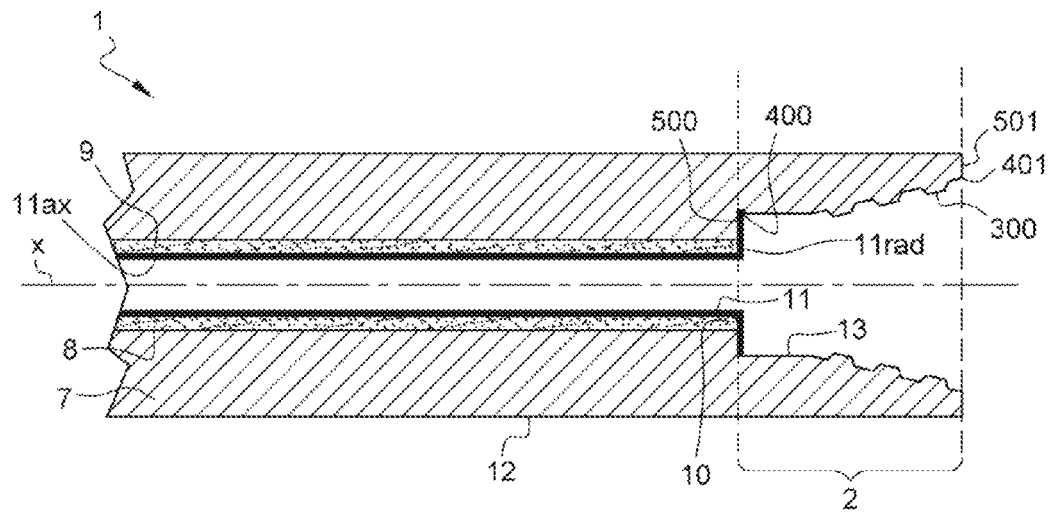

FIG. 3 is a schematic view in longitudinal section of a portion of a metal tubular component in accordance with an embodiment of the invention provided with a female connector.

Figure 4:
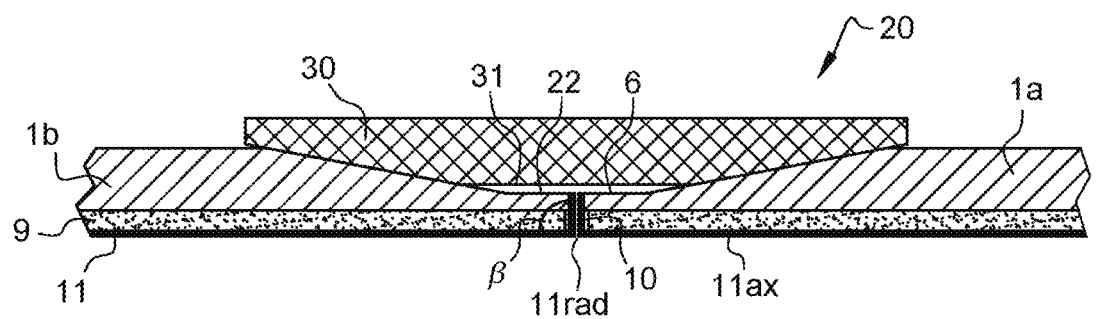

FIG. 4 is a schematic view in longitudinal section of a part of a joint comprising two metal tubular components as schematically represented in FIG. 2 assembled together by a coupling element (threads not represented).

Figure 5:
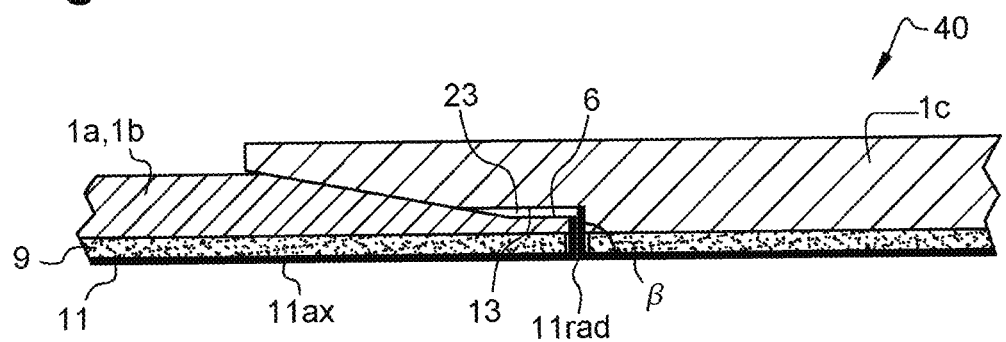

FIG. 5 is a schematic view in longitudinal section of a part of a joint comprising a first tubular component as schematically represented in FIG. 2 and a second metal tubular component as schematically represented in FIG. 3 (threads not represented).

DESCRIPTION OF EMBODIMENTS

FIG. 1 is a view in longitudinal section of a portion of a metal tubular component 1 provided with a male connector in accordance with an embodiment of the invention (liner not represented).

The metal tubular component 1 has a longitudinal axis x, a body 12, a wall 7 that extends along the longitudinal axis x and a first axial end 2. The first axial end 2 extends between the body 12 and a male internal abutment surface 5. The axial end 2 is therefore immediately adjacent to the body 12. The metal tubular component 1 is a circular cylinder. By circular cylinder is meant a cylindrical shape having a circular section. Accordingly, the longitudinal axis x is also the generatrix along which the metal tubular component 1 extends.

The first axial end 2 is provided with a male connector. The male connector comprises in the following order from the body 12: a male thread 3, a lip 6, a male distal end 4 and a male internal abutment surface 5. The lip 6 extends from the male thread 3 as far as the male internal abutment surface 5. A junction between the lip 6 and the male internal abutment surface 5 forms the male distal end. The metal tubular component 1 may have a second axial end (not represented), said second axial end being axially opposite the first axial end 2. The second axial end may be provided with a connector identical to or different from the male connector at the first axial end 2. For example, the second axial end may be provided with a male or female connector having a structure, dimensions and a geometry identical to or different from those of the male connector at the first axial end 2. A connector of a metal tubular component 1 in accordance with the invention may also include two or more threads and/or two or more abutment surfaces. For example, in accordance with a variant of the embodiment depicted in FIG. 1 an intermediate abutment surface could be present between two threaded portions of the male connector.

The wall 7 is a metal wall and has an internal surface 8. The internal surface 8 is entirely coated by a layer of thermally-insulating material 9, including the internal surface portion 8 of the first axial end 2 of the metal tubular component 1. The first axial end 2 that includes the male connector is therefore thermally insulated. Thus, the metal tubular component is thermally insulated over its entire axial length. Consequently, in use in a geothermal well of such a metal tubular component 1 that is thermally insulated the loss of heat by fluids circulating in the well made up of such tubular components is reduced.

In the embodiments depicted in FIGS. 1 to 5 the layer of thermally-insulating material 9 is produced using the usual techniques employed by the person skilled in the art, such as stacking concrete or ceramic bricks prestressed by the liner. To this end it is known to tension the metal element, here the liner, in order, in reaction, for the concrete or ceramic elements to be in compression. For example, the liner may be heated during the installation of the bricks and thus, as it cools, the liner generates a compression stress on the bricks by virtue of a coefficient of expansion difference.

The layer of thermally-insulating material 9 has a first insulating surface 9a and a second insulating surface 9b. The first insulating surface 9a and the second insulating surface 9b extend axially and delimit an insulation thickness e of the layer of thermally-insulating material 9. The insulation thickness e has a substantially constant value over the entire axial length of the layer of thermally-insulating material 9. Here by "substantially constant" is meant that in use of the metal tubular component 1 the value of the insulation thickness e is not necessarily identical at all points in the layer of thermally-insulating material 9. In fact, the insulation thickness e can vary depending on the zone in which it is measured because, given the effect of the heat emitted by fluids circulating in the metal tubular component 1, the insulating material may not expand uniformly. For example, the insulation thickness e can vary from 2% to 5% depending on the area in which it is measured. Furthermore, the layer of thermally insulating material 9 forms a shoulder having a radial end surface 10. The radial end surface 10 extends radially between the first insulating surface 9a and the second insulating surface 9b. In the embodiments represented in FIGS. 1 to 5 the radial end surface 10 extends radially in line with the internal abutment surface 5 between the first insulating surface 9a and the second insulating surface 9b. In other words, in the embodiment represented in FIGS. 1 to 5 the radial end surface 10 and the male internal abutment surface 5 or the female internal abutment surface 500 are radially aligned. In accordance with the invention the radial end surface 10 and the male internal abutment surface 5 or the female internal abutment surface 500 may also not be radially aligned. For example, this may be the case when the tubular component is not under conditions of use. In this case the thermally-insulating material 9 may not be subjected to temperatures high enough for it to expand. The volume of the layer of thermally-insulating material 9 is then lower and the radial end surface 10 and the male internal abutment surface 5 or the female internal abutment surface 500 are then axially separated by a few millimeters. Here by "axially separated" is meant that the separation is measured along the longitudinal axis x. The thermally-insulating material 9 is concrete in the embodiment depicted in FIGS. 1 to 5. The material may equally well consist of bricks. The advantage of using these materials is that the mass per unit volume is much less than the mass per unit volume of the steel that constitutes the wall 7 of the tubular component. For example the mass per unit volume of concrete is approximately 2500 kg/m$^3$ and the mass per unit volume of brick is approximately 1800 kg/m$^3$, whereas the mass per unit volume of a steel that could be used for a metal tubular component in accordance with the invention is between 6800 kg/m$^3$ and 9000 kg/m$^3$ and on average approximately 7850 kg/m$^3$. Thus the total weight of a metal tubular component in accordance with the invention is much less than the total weight of an insulated metal tubular element with a VIT structure. Furthermore, the axial ends being also thermally insulated, a tubular component in accordance with the invention also offers better insulation than prior art tubular components, in particular at the level of the connectors.

In FIG. 2 elements bearing the same reference numbers as in FIG. 1 are identical to those in the latter and have the same functions. As depicted in FIG. 2 the metal tubular component 1 includes a liner 11. The liner 11 includes an axial portion 11ax and a radial portion 11rad. The axial portion 11ax extends along the longitudinal axis x over the entirety of the second insulating surface 9b and the radial portion 11rad extends radially over the entirety of the radial end surface 10 and over the entirety of the male internal abutment surface 5.

The radial portion 11rad of the liner 11 is welded to the male distal end 4. The layer of thermally-insulating material 9 is therefore entirely covered by the liner 11 over its free surface, both on its second insulating surface 9b and its radial end surface 10. Thus, the liner 11 holds the layer of thermally-insulating material 9 pressed against the internal surface 8 and therefore protects it from fluids circulating at high pressure in the metal tubular component 1. This also makes it possible to provide good thermal insulation over the entire length of the metal tubular component 1.

The liner 11 is made of a corrosion-resistant metal alloy. For example the liner 11 is made of a 316L steel known to the person skilled in the art. In the embodiment depicted in FIGS. 1 to 5 the liner 11 may be pressed against the second insulating surface 9b by hydraulic expansion or by any other technique known to the person skilled in the art.

FIG. 3 is a view in longitudinal section of a portion of a metal tubular component 1 in accordance with an embodiment of the invention provided with a female connector.

The body 12 of the metal tubular component 1 depicted in FIG. 3 is identical to the body 12 of the metal tubular component 1 depicted in FIGS. 1 and 2. The thermally-insulating material 9 and the liner are also identical to those depicted in FIGS. 1 and 2.

In an analogous manner to the embodiment depicted in FIGS. 1 and 2 the metal tubular component 1 depicted in FIG. 3 has a first axial end 2.

In the embodiment depicted in FIG. 3 the first axial end 2 extends between the body 12 and the female external abutment 5. The first axial end 2 is therefore immediately adjacent to the body 12.

The first axial end 2 is provided with a female connector. The female connector comprises in the following order from the body 12: a female internal abutment surface 500, a female internal abutment base 400, a female housing inside diameter 13, a female thread 300, a female distal end 401 and a female external abutment surface 501.

The female housing inside diameter 13 extends from the female internal abutment base 400 as far as the female thread 300. A junction between the female housing inside diameter 13 and the female internal abutment surface 500 forms a female internal abutment base 400. The metal tubular component 1 may have a second axial end (not represented), said second axial end being axially opposite the first axial end 2. The second axial end may be provided with a connector identical to or different from the male connector at the first axial end 2. For example, the second axial end may be provided with a male or female connector having a structure, dimensions and a geometry identical to or different from those of the female connector at the first axial end 2.

A connector of a metal tubular component 1 in accordance with the invention may include two or more threads and/or a plurality of abutment surfaces. For example, in accordance with a variant of the embodiment depicted in FIG. 3 an intermediate abutment surface could be present between two threaded portions of the female connector.

The radial portion 11rad of the liner 11 extends radially over the entirety of the female internal abutment surface 500. The radial portion 11rad of the liner 11 is welded to the female internal abutment base 400. The layer of thermally insulating material 9 is therefore entirely covered by the liner 11, both over its second insulating surface 9b and over its radial end surface 10. Thus the liner 11 holds the layer of thermally-insulating material 9 pressed against the internal surface 8 and therefore protects it from fluids circulating at high pressure in the metal component 1. This also makes it possible to provide good thermal insulation over the entire length of the body 12 of the metal tubular component 1.

Contrarywise to the tubular component depicted in FIGS. 1 and 2 the tubular component 1 depicted in FIG. 3 has no thermal insulation at the level of its axial end 2, in particular at the level of its female connector, when it is not coupled to a male tubular component so as to form a joint.

FIG. 4 is a view in longitudinal section of a part of a joint 20 comprising a first tubular component 1a and a second tubular component 1b. The first tubular component 1a and the second tubular component 1b are both identical to that depicted in FIG. 2 and assembled together by a coupling element 30 (threads 3 and 300 not represented). The coupling element 30 is screwed onto a first male connector of the first tubular component 1a on the one hand and to a second male connector of the second tubular component 1b on the other hand.

The liner 11 forms an angle β at the junction between its axial portion 11ax and its radial portion 11rad. The angle β has a value that can be between 85° and 90° inclusive. In the embodiment represented in FIG. 4 the angle β has a preferred value of 90°. Such a value for the angle β makes it possible to avoid producing a void between the liner 11 and the layer of thermally-insulating material 9 during use of a joint 20. In fact, the presence of such a void could lead to deformation of the liner 11 that might cause it to break up, in particular at the level of the junction between its axial portion 11ax and its radial portion 11rad.

The radial portions 11rad of the liners of the two metal tubular components 1a and 1b are pinched against one another which improves the seal at the interface between these two radial portions 11rad.

In the coupled position a void zone 22 is formed between the lips 6 of the metal tubular components 1a and 1b and a cylindrical internal surface 31 of the coupling element 30 facing the lips 6. This void zone 22 makes it possible to prevent radial interference. This limits wear of the tubular components caused in particular by their multiple assemblies by screwing them together.

FIG. 5 is a view in longitudinal section of a part of a joint 40 comprising a first tubular component 1a, 1b and a second tubular component 1c. The first tubular component 1a, 1b is identical to that schematically represented in FIG. 2 and the second tubular component 1c is identical to that schematically represented in FIG. 3 (threads not represented).

In a manner analogous to the embodiment depicted in FIG. 4 the liner 11 forms an angle β at the junction between its axial portion 11ax and its radial portion 11rad. The angle β has a value that can be between 85° and 90° inclusive. In the embodiment represented in FIG. 5 the angle β has a preferred value of 90°.

In an analogous manner to the embodiment depicted in FIG. 4 such a value for the angle β makes it possible to avoid producing a void between the liner 11 and the layer of thermally-insulating material 9 during use of a joint 40. In fact, the presence of such a void could lead to deformation of the liner 11 that might cause it to break up, in particular at the level of the junction between its axial portion 11ax and its radial portion 11rad.

The radial portions 11rad of the liners 11 of the first tubular component 1a, 1b and of the second tubular component 1c are pinched against one another, which improves the seal at the interface between these two radial portions 11rad. Such pinching can also generate traction forces on the liners 11, in particular at the level of their respective fixing points. Welding produces a good attachment and makes it possible to avoid detachment of the liners at the level of their fixing point because of the traction forces generated by pinching and coupling/uncoupling operations.

In the coupled position a void zone 23 is formed between the lip 6 of the first metal tubular component 1a, 1b and the female housing inside diameter 13 of the second tubular component 1c facing the lip 6. This void zone 23 makes it possible to avoid radial interference. This significantly limits wear of the tubular components caused in particular by multiple assemblies thereof by screwing them together.

A joint 20, 40 in accordance with the present invention is therefore particularly robust and suitable for the conditions in which it is to be used. In particular, a joint 20, 40 in accordance with the present invention provides robust particularly thermal insulation suited to the conditions in which it is to be used, primarily in the geothermal field.

The invention claimed is:

1. A metal tubular component adapted to be associated with at least one other metal tubular component to form a joint, said metal tubular component having a longitudinal axis, the metal tubular component comprising:
a body;
at least one first axial end adjacent to the body, said first axial end being provided with a connector including a thread and an internal abutment surface; and
a wall with an internal surface, said internal surface being coated with a layer of a thermally-insulating material, said layer of thermally-insulating material being covered by a liner,
wherein said liner has an axial portion extending along the longitudinal axis and a radial portion, said radial portion extending along an entirety of the internal abutment surface, and
wherein the liner is welded to the connector.

2. The metal tubular component as claimed in claim 1, wherein the radial portion of the liner is welded to the connector:
either at a male distal end when the connector is a male connector,
or at the base of a female internal abutment when the connector is a female connector.

3. The metal tubular component as claimed in claim 1, wherein the liner is a metal liner produced using a corrosion-resistant alloy.

4. The metal tubular component as claimed in claim 1, wherein the liner has a thickness between 1 mm and 10 mm inclusive.

5. The metal tubular component as claimed in claim 1, wherein the thermally-insulating material has a mass per unit volume less than or equal to 50% of the mass per unit volume of the steel, the mass per unit volume of said steel being between 6800 and 9000 kg/m$^3$ inclusive.

6. The metal tubular component as claimed in claim 1, wherein a junction between the axial portion and the radial portion of the liner forms an angle β between 85° and 90° inclusive.

7. A tubular threaded joint comprising a first tubular component as claimed in claim 1, said first tubular component including a male connector, a second tubular component as claimed in claim 1, said second tubular component including a female connector, the first tubular component and the second tubular component being assembled together by screwing the male connector of the first tubular component into the female connector of the second tubular component.

8. A tubular threaded joint comprising a first tubular component as claimed in claim 1, said first tubular component including a first male connector, a second tubular component as claimed in claim 1, said second tubular component including a second male connector, and
a coupling element assembled with the first male connector and with the second male connector.

9. A method for obtaining a metal tubular component as claimed in claim 1, said method including at least the following steps: a step of pressing the liner against the layer of thermally-insulating material by hydraulic expansion and a step of welding the liner to the male connector.

10. The metal tubular component as claimed in claim 1, wherein the liner has a thickness between 1 mm and 5 mm inclusive.

11. The metal tubular component as claimed in claim 1, wherein the thermally-insulating material has a mass per unit volume less than or equal to 40% of the mass per unit volume of the steel, the mass per unit volume of said steel being between 6800 and 9000 kg/m$^3$ inclusive.

12. The metal tubular component as claimed in claim 1, wherein a junction between the axial portion and the radial portion of the liner forms an angle β between 89° and 90° inclusive.

13. The metal tubular component as claimed in claim 1, wherein the thermally-insulating material has a mass per unit volume less than or equal to 35% of the mass per unit volume of the steel, the mass per unit volume of said steel being between 6800 and 9000 kg/m$^3$ inclusive.

* * * * *